United States Patent Office 3,244,607
Patented Apr. 5, 1966

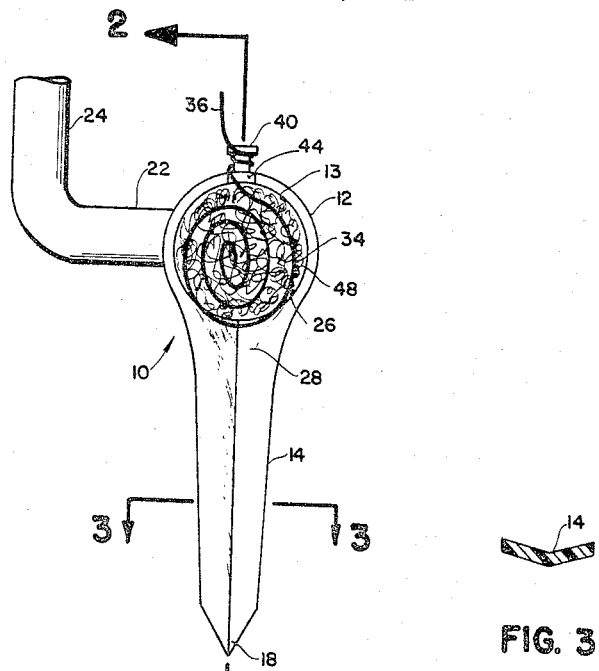
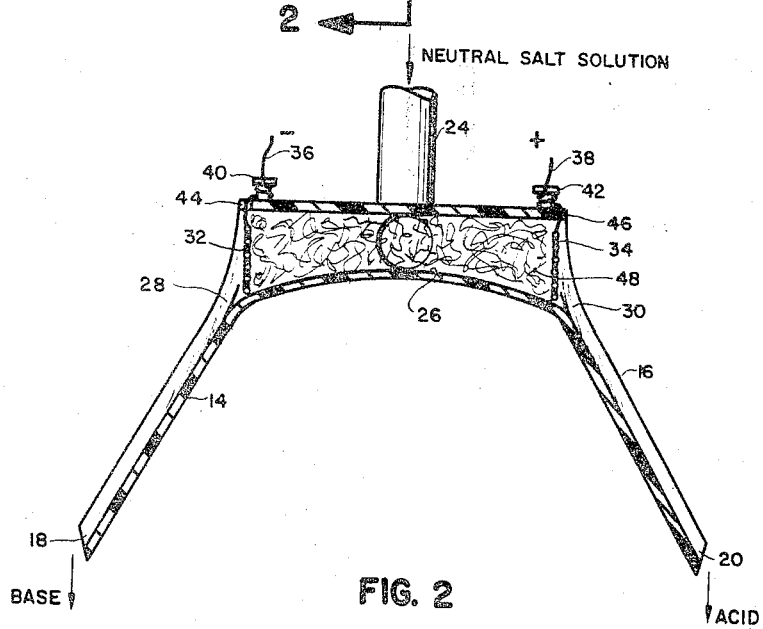

3,244,607
COULOMETRIC REAGENT GENERATOR
John E. Leonard, Fullerton, and Robert R. Austin, Pasadena, Calif., assignors to Beckman Instruments, Inc., a corporation of California
Filed Oct. 9, 1961, Ser. No. 143,657
11 Claims. (Cl. 204—195)

This invention relates to coulometric titrations and more particularly relates to a reagent generator for use in external coulometric titrations.

Coulometric titrations utilize the known principle that the rate of generation of reagent or titrant produced by the electrolysis of a suitable electrolyte is directly proportional to the electrical current involved in the electrolysis. In the past, coulometric generation of titrant has usually employed an "internal" technique. In such titrations, the electrical current is passed between a pair of electrodes immersed in the sample medium which is to be titrated. More recently, the possibility of "external" generation of reagent has been demonstrated. In this technique, reagent is generated by passing the current through an electrolyte contained in a cell remote from the titration cell, then transferring the reagent formed by the electrolysis to the solution to be titrated. In both of these methods of titration, the rate of generation of reagent is directly proportional to the current traversing the generating electrodes; therefore the current, or electrical charge transfer within a given time interval, is an accurate measure of the titer of a sample that has reacted during that time with the reagent to an equivalence point.

Since the direct immersion of the electrodes in the sample titration vessel often leads to undesirable chemical interferences and electrode contamination, efforts have been made to provide suitable generating cells for externally generated reagents. An example of such a proposed cell is shown in the U.S. Patent to De Ford et al. No. 2,744,061. One of the disadvantages of all the known prior proposals arises from the fact that gases are frequently generated at one or both electrodes during the time that the reaction takes place.

In the prior art devices, this gas was swept out of the system through the delivery tubes leading from the generating cell to the titration cell in the form of entrained gas bubbles. Because of the limited diameter of the delivery tubes, an appreciable back pressure resists the flowing liquid and gas. The bubbles cause this back pressure to fluctuate markedly. The presence of a back pressure, especially a fluctuating back pressure on the cell causes back diffusion and mixing of the generated reagents between the electrodes. A variable and unpredictable error is thus caused in the operation of the cell, since the amount of reagent delivered from the cell is no longer strictly proportional to the electrical energy expended in performing the electrolysis.

In addition, the presence of these bubbles in the reagent stream represents a fluctuation in the rate of delivery of reagent, and this may adversely affect certain titrations, for example of the continuous type where sample and reagent are mixed continuously. In such titrations, flow fluctuation presents a large noise signal to the equivalence point sensing system. Another shortcoming of prior art cells is the relatively large fluctuation of cell resistance and current due to bubble accumulation at one or both electrodes, especially at high current levels.

According to the present invention, it has now been found that a coulometric reagent generator can be provided that eliminates entrained gas bubbles in the reagent stream and in addition allows great flexibility in the choice of electrodes. Further, fluctuations in resistance and current are greatly reduced. These improved operating characteristics are obtained by constructing the cell as a hollow body open at each end and mounting the electrodes in the openings at each end of the cell body. The cell body is also provided at each end with a drainage guide which descends directly downward from the generating electrode and is open on top. The open construction of the cell body and the drainage guides provides rapid and unobstructed venting of the gases formed during electrolysis, and the position of the drainage guides allows delivery of reagent to the titration vessel with a minimum of hold-up time.

It is therefore a primary object of the present invention to provide a coulometric reagent generator having provisions for rapid and unobstructed venting of gases formed during electrolysis.

It is also an object of the present invention to provide a coulometric reagent generator in which the electrodes are accessible from the exterior of the cell for easy mounting, inspection and replacement.

It is another object of the present invention to provide a coulometric reagent generator which delivers reagent with a minimum of hold-up time and without any possibility of back diffusion of the reaction products.

These and further objects and advantages of the invention will become more apparent upon reference to the following specification and claims and appended drawings wherein:

FIG. 1 is an end view of the coulometric reagent generator of the present invention;

FIG. 2 is a sectional view taken along the line 2—2 of FIG. 1; and

FIG. 3 is a sectional view taken along line 3—3 of FIG. 1.

Referring now to the several figures, there is shown a coulometric reagent generator, generally indicated at 10, having a central body 12 having a chamber or passageway 13 therein and from which depend a pair of drainage guides 14 and 16 which end in reagent delivery tips 18 and 20 respectively. As may clearly be seen in FIG. 3, these drainage guides are generally triangular or trough shaped so that any liquid leaving the cell body will flow down these guides in a ribbon-shape stream, one side of the ribbon being continuously in contact with the guide and the other side of the ribbon being continuously exposed to air or other gaseous medium forming the atmosphere around the cell.

The horizontal leg 22 of an L-shaped supply tube 24 connected at its upper end to a source of suitable electrolyte (not shown) is connected to the cell body 12 and is in fluid communication with the interior passageway 13 thereof by means of a second passageway in the cell body which is substantially normal to the first passageway. The cell body 12 may be cylindrical in cross section if desired, but preferably is constructed so that the lower surface 26 of the interior passageway 13 in the body has a slightly downward slope from the center of the body to the two guides 14 and 16. This downward slope is indicated at 28 and 30.

A pair of platinum electrodes 32 and 34 of generally spiral shape are mounted at either end of the passageway in the cell body 12. These electrodes may be mounted on the cell body in any suitable fashion, and as shown are mounted by fastening their lead wires 36 and 38 to a pair of posts 40 and 42 mounted on the cell body. These posts may be formed integrally with the cell body 12 or may be attached thereto by any appropriate adhesive. As shown, the lead wires 36 and 38 are merely wrapped around the posts 40 and 42, but it will be apparent to one skilled in the art that they may be fastened in any other convenient manner.

In order that the electrodes 32 and 34 can be placed slightly within the ends of the passageway in cell body 12 and directly above the drainage guides 14 and 16, the upper surface of the body is provided with notches 44 and 46. The interior portion of the cell body 12 between the electrodes 32 and 34 is filled with a uniform glass wool packing 48 and the inner surfaces of the electrodes firmly pressed against this packing. The glass wool packing acts to feed or distribute the electrolyte uniformly over the surfaces of electrodes 32 and 34. Also, it prevents bubble formation or accumulation on the rear or inner electrode surfaces.

The cell body 12 and drainage guides 14 and 16 are preferably made integral although they may be made separately and fastened together in any suitable fashion. The cell body and drainage guides are preferably made of polyethylene and the feed tube 24 of glass, although the cell body and drainage guides may also be made of glass or another suitable plastic.

In operation, a suitable electrolyte, such as a neutral salt solution, is supplied to the interior passageway of the cell body 12 through the feed tube 24. For generation of acid and base, for example, this may be a sodium sulfate solution. The lead wires 36 and 38 are connected to a suitable source of D.C. current; as shown, the lead wire 36 is connected to the negative terminal of such a source and lead wire 38 is connected to the positive terminal of the source. The electrolyte is conveyed by the glass wool packing 48 to the surfaces of the platinum electrodes 32 and 34 where it forms a thin liquid film and then flows immediately down into the drainage guides 14 and 16 which are located under the lower edges of the electrodes and which quickly carry the solution away from the electrodes to the delivery tips 18 and 20.

When a D.C. voltage is applied to the electrodes, electrolysis occurs in the thin liquid film of electrolyte on the electrode surfaces. Since the electrodes are not enclosed, gases formed by this reaction escape immediately to the atmosphere and the generated reagents, for example hydrogen and hydroxyl ions, are swept quickly down their respective drainage guides without any tendency toward back diffusion and mixing of reaction product. The exposed mounting of the electrodes also allows maintenance of low voltage operation at reasonably low electrolyte flow rates since there is a rapid disposal of gas that otherwise increases the overall cell resistance. The downward slope of the bottom 26 of the passageway in the reaction cell as indicated at 28 and 30 aids cell operation by preventing stagnation of electrolyte with the consequent possibility of back diffusion, or at least relatively slow flushing which might occur if the bottom surface 26 of the cell body 12 was horizontal.

As the generated reagents flow down the drainage guides 14 and 16 in ribbon-shape streams, one side of each stream will be continuously exposed to the air or any other suitable gaseous medium forming the atmosphere surrounding the cell, thus permitting the continuous venting of any bubbles that might still be present in the stream. In the case of acid-base generation, the base solution flowing from the delivery tip 18 and the acidic solution flowing from the delivery tip 20 may both be used in different titrations. The stream that is unused at any given time is passed to waste.

It is apparent that the mounting of the electrodes from outside the generator cell body, that is, without any need for passing connections through the wall of the cell itself considerably simplifies the construction, assembly and maintenance of the electrodes. It allows flexibility in choice of their size, structure and material of their construction, and also makes it possible to quickly change from acid-base generation, for example, to the generation of silver ion by substitution of a silver anode for the platinum anode and the use of a suitable different electrolyte, for example an acetate buffer solution.

It will be apparent from the foregoing that the present invention provides an electrolytic reagent generator which has great flexibility, is easy to construct and adjust, and provides reagents with a minimum hold-up time. The electrical noise of the cell is very low. The cell exhibits no discernible departure from ideal coulometric efficiency and is extremely well adapted for use with electrical end-point determining systems, for example, in automatic titration systems where minimum hold-up and low noise are essential to accuracy and speed of titration.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. In a coulometric reagent generator, the combination of:
   a body portion having a passageway therethrough providing a pair of noncapillary open ends;
   first and second spaced electrodes comprising an anode and a cathode located in said passageway;
   means connected to said body portion between said electrodes for supplying electrolyte to said passageway;
   porous nonconducting means in said passageway between said electrodes for conveying electrolyte thereto;
   said electrodes having one side contacting said porous means and the other side exposed to the atmosphere through said open ends of said body portion; and
   means located at the bottom of said body portion immediately adjacent the lower edge of at least one of said electrodes for permitting the flow of electrolyte away from said electrode, whereby electrolyte including the generated reagent is immediately carried away so that only a thin film of electrolyte appears on the outer surface of the electrode.

2. A coulometric reagent addition generator as set forth in claim 1 wherein said last-mentioned means comprises a trough-shaped guide sloping immediately down and away from said electrode.

3. A coulometric reagent addition generator as set forth in claim 1 including means for impressing a potential across said electrodes.

4. In a coulometric reagent generator, the combination of:
   a body portion having a passageway therethrough providing a pair of noncapillary open ends;
   first and second electrodes comprising an anode and a cathode located adjacent said open ends of said body portion with one side of said electrodes exposed to the atmosphere;
   means connected to said body portion between said open ends for supplying electrolyte to said passageway; and
   porous nonconducting means in said passageway contacting said electrodes for conveying electrolyte thereto;
   whereby a liquid-gas interface is provided at said electrodes thus permitting gases formed at said electrodes during reagent generation to escape directly to the atmosphere.

5. A coulometric reagent addition generator as set forth in claim 4 wherein the lower wall of said body portion slopes downwardly toward the open ends thereof.

6. In a coulometric reagent generator, the combination of:
   a body portion having a passageway therethrough providing a pair of noncapillary open ends;
   first and second electrodes comprising an anode and a cathode located adjacent said open ends of said body portion whereby said electrodes are exposed to the atmosphere;

means connected to said body portion between said open ends for supplying electrolyte to said passageway;

porous nonconducting means in said passageway contacting said electrodes for conveying electrolyte thereto;

whereby a liquid-gas interface is provided at said electrodes thus permitting gases formed at said electrodes during reagent generation to escape directly to the atmosphere; and guide means attached to said body portion immediately adjacent the lower edge of at least one of said electrodes for flowing fluid away from said electrode, whereby electrolyte including the generated reagent is immediately carried away so that only a thin film of electrolyte appears on the outer surface of the electrode.

7. A coulometric reagent addition generator as set forth in claim 6 wherein said guide means is trough-shaped so that fluid flowing therethrough is partially exposed to the atmosphere.

8. In a coulometric reagent generator, the combination of:

a body portion having a passageway therethrough providing a pair of noncapillary open ends;

first and second electrodes comprising an anode and a cathode located adjacent said open ends of said body portion whereby said electrodes are exposed to the atmosphere;

means connected to said body portion between said open ends for supplying electrolyte to said passageway;

porous nonconducting means in said passageway contacting said electrodes for conveying electrolyte thereto;

whereby a liquid-gas interface is provided at said electrodes thus permitting gases formed at said electrodes during reagent generation to escape directly to the atmosphere; and guide means attached to said body portion adjacent the lower edge of said electrodes, said guide means sloping immediately down and away from said electrodes and being trough-shaped so that fluid flowing therethrough is partially exposed to the atmosphere, whereby electrolyte including the generated reagent is immediately carried away so that only a thin film of electrolyte appears on the outer surface of the electrode.

9. In a coulometric reagent generator, the combination of:

a substantially straight body portion having a passageway therethrough providing a pair of noncapillary open ends, said passageway being substantially larger than a capillary passage;

means connected to said body portion between said open ends for supplying electrolyte to said passageway;

first and second spaced electrodes comprising an anode and a cathode in said passageway, one of said electrodes being located between said electrolyte supplying means and one of said open ends and the other of said electrodes being located between said electrolyte supplying means and the other of said open ends, whereby said electrodes are exposed to the atmosphere so that only a thin film of electrolyte appears on the outer surface of the electrode; and porous nonconducting means in said passageway between and contacting said electrodes for conveying electrolyte thereto;

whereby a liquid-gas interface is provided at said electrodes thus permitting gases formed at said electrodes during reagent generation to escape directly to the atmosphere.

10. A coulometric reagent generator as set forth in claim 9 including guide means attached to said body portion immediately adjacent the lower edge of at least one of said electrodes for flowing fluid away from said electrode, whereby electrolyte including the generated reagent is immediately carried away.

11. In a coulometric reagent generator, the combination of:

a body portion having a passageway therethrough providing a pair of noncapillary open ends;

first and second spaced electrodes comprising an anode and a cathode located in said passageway;

means connected to said body portion between said electrodes for supplying electrolyte to said passageway;

porous nonconducting means in said passageway between said electrodes for conveying electrolyte thereto;

said electrodes having one side contacting said porous means and the other side exposed to the atmosphere through said open ends of said body portion; and guide means other than said body portion attached to said body portion adjacent the lower edge of at least one of said electrodes, said guide means sloping immediately down and away from said body portion and electrode for flowing electrolyte away from said electrode, and said guide means being the sole means for flowing electrolyte away from said electrode, whereby electrolyte including the generated reagent is immediately carried away so that only a thin film of electrolyte appears on the outer surface of the electrode.

References Cited by the Examiner

UNITED STATES PATENTS

| | | | |
|---|---|---|---|
| 961,945 | 6/1910 | Finlay | 204—129 |
| 2,247,065 | 6/1941 | Pauli et al. | 204—180 |
| 2,307,137 | 1/1943 | Kennedy | 204—195 |
| 2,547,231 | 4/1951 | Sartakoff | 204—180 |
| 2,744,061 | 5/1956 | De Ford et al. | 204—195 |
| 3,109,788 | 11/1963 | Miller et al. | 204—129 |

OTHER REFERENCES

Bett et al.: "Analyst," volume 79, 1954, pages 607–616.

JOHN H. MACK, Primary Examiner.

JOSEPH REBOLD, WINSTON A. DOUGLAS,
Examiners.